(12) United States Patent
Xu et al.

(10) Patent No.: US 12,288,568 B1
(45) Date of Patent: Apr. 29, 2025

(54) NEAR FIELD TRANSDUCER WITH TEMPLATE LAYER FOR IMPROVED RELIABILITY

(71) Applicant: Headway Technologies, Inc., Milpitas, CA (US)

(72) Inventors: Weihao Xu, San Jose, CA (US); Shengyuan Wang, San Jose, CA (US); Dingchuan Xue, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 18/637,324

(22) Filed: Apr. 16, 2024

(51) Int. Cl.
*G11B 13/08* (2006.01)
*G11B 5/31* (2006.01)
*G11B 5/00* (2006.01)

(52) U.S. Cl.
CPC ............ *G11B 13/08* (2013.01); *G11B 5/314* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 9,343,089 B2 * | 5/2016 | Habermas | G11B 5/3163 |
| 10,262,683 B2 | 4/2019 | Staffaroni et al. | |
| 10,304,482 B2 * | 5/2019 | Cheng | G11B 5/187 |
| 10,586,560 B1 | 3/2020 | Wang et al. | |
| 2014/0307534 A1 * | 10/2014 | Zhou | G11B 5/314 |
| | | | 216/22 |
| 2022/0051694 A1 * | 2/2022 | Zhao | H01F 10/30 |
| 2022/0366934 A1 * | 11/2022 | Kautzky | G11B 7/124 |

* cited by examiner

*Primary Examiner* — Peter Vincent Agustin
(74) *Attorney, Agent, or Firm* — DLA Piper LLP (US)

(57) ABSTRACT

A method of fabricating a near field transducer (NFT) in a thermally assisted magnetic recording (TAMR) head is disclosed. In some embodiments, the method includes: depositing a dielectric layer and a template layer on a waveguide core; patterning the template layer to form a template; depositing an Au NFT layer; planarizing the Au NFT layer to generate a planar layer; depositing an upper NFT layer; applying a peg patterning mask; etching the upper NFT layer and the planar layer that includes the Au NFT layer; removing the template; and depositing a dielectric material and planarizing an upper surface that includes the upper NFT layer.

20 Claims, 13 Drawing Sheets

NEAR FIELD TRANSDUCER WITH TEMPLATE LAYER FOR IMPROVED RELIABILITY

TECHNICAL FIELD

Embodiments of the present disclosure relate generally to a thermally assisted magnetic recording (TAMR) device, and in particular to a near field transducer (NFT) structure.

BACKGROUND

To further increase the magnetic recording density of hard disk drive (HDD) systems, there is an increasing demand to improve the performance of thin film magnetic heads. A perpendicular magnetic recording (PMR) head that combines a single pole writer with a tunneling magnetoresistive (TMR) reader provides a high write field and large read-back signal to provide enhanced area density capability (ADC). However, increasing the magnetic recording areal density requires smaller grain sizes in the magnetic recording media, which in turn reduces storage lifetime. In order to maintain durable storage lifetime, media thermal stability has to be increased. Consequently, the magnetic field generated by the writer's main pole as well as the current from the coil around the main pole may not be strong enough to switch the magnetic recording bits for data recording.

To solve this magnetic recording dilemma, thermally-assisted magnetic recording (TAMR) has been introduced. In the thermally-assisted magnetic head recording apparatus, a light (optical radiation) source, such as a semiconductor laser diode, is typically suggested as the source of thermal energy. Light from such a light-emitting device is introduced into an optical waveguide configured to propagate the light. As waveguide core material, $TaO_x$ or SiON can be used. The waveguide is surrounded with cladding material, such as $Al_2O_3$, SiON or $SiO_2$.

The combination supports a travelling mode of electromagnetic radiation. The waveguide propagated electromagnetic radiation is transferred, by electromagnetic coupling, to a plasmon generator (PG) adjacent to (above or below) the waveguide at the distal end of the waveguide. Here the waveguide excites plasmon modes in the generator. The plasmon generator is usually made of highly conductive material such as Au or Ag. The optical radiation coupled by the waveguide to the plasmon generator is in turn coupled to the recording medium via plasmon near-field energy, and, thus, heats the surface of recording media. Since the plasmon energy is transferred to the magnetic medium from the near field of the plasmon rather than by directly focusing the optical radiation of the laser, the size of the region on the recording medium that can be effectively heated is not limited by diffraction effects of the radiation and is, therefore, much smaller than would be produced by using the optical radiation directly. It is to be noted that the PG typically terminates at its distal end with a small protruding "peg," whose role is to further concentrate the plasmon energy at the sharpest possibly defined spot on the recording media.

The reliability of TAMR heads is presently of great concern. Therefore, there is a need for an improved TAMR write head with improved reliability.

SUMMARY

Broadly, embodiments of the present disclosure provide a near field transducer (NFT) structure that enables better TAMR device reliability and a method of fabricating a NFT in a TAMR head. According to some embodiments of the present disclosure, the method of fabricating a near field transducer (NFT) in a thermally assisted magnetic recording (TAMR) head, can comprise: depositing a dielectric layer and a template layer on a waveguide core; patterning the template layer to form a template; depositing an Au NFT layer; planarizing the Au NFT layer to generate a planar layer; depositing an upper NFT layer; applying a peg patterning mask; etching the upper NFT layer and the planar layer that includes the Au NFT layer; removing the template; and depositing a dielectric material and planarizing an upper surface that includes the upper NFT layer.

According to some embodiments of the present disclosure, the dielectric layer includes alumina ($Al_2O_3$), SiON or $SiO_2$.

According to some embodiments of the present disclosure, depositing the dielectric layer is by atomic layer deposition (ALD).

According to some embodiments of the present disclosure, the dielectric layer is a ALD $Al_2O_3$(atomic layer deposition of alumina) layer.

According to some embodiments of the present disclosure, patterning the template layer to form the template includes depositing a photoresist on the template layer, transferring a pattern in the photoresist to the template layer by etching, and stripping the photoresist.

According to some embodiments of the present disclosure, transferring the pattern in the photoresist to the template layer by etching forms a shape of the template.

According to some embodiments of the present disclosure, the template extends along the ABS.

According to some embodiments of the present disclosure, the etching performed is an ion beam etching (IBE).

According to some embodiments of the present disclosure, planarizing the Au NFT layer includes removing an after field Au portion of the Au NFT layer, depositing a second dielectric layer, and applying a chemical mechanical polishing (CMP) process to generate a planar layer.

According to some embodiments of the present disclosure, the planar layer includes the second dielectric layer, the Au NFT layer, and the template.

According to some embodiments of the present disclosure, the planar layer is in direct contact with the dielectric layer.

According to some embodiments of the present disclosure, the upper NFT layer includes a platinum group metal, such as ruthenium, rhodium, palladium, osmium, iridium, and platinum, or combinations thereof.

According to some embodiments of the present disclosure, the upper NFT layer is a Rh NFT layer deposited over the planar layer.

According to some embodiments of the present disclosure, applying the peg patterning mask includes depositing a photoresist layer on the upper NFT layer and patterning the photoresist layer to form a photoresist mask.

According to some embodiments of the present disclosure, etching the upper NFT layer and the planar layer is a dry etching process.

According to some embodiments of the present disclosure, the method can further comprise removing the photoresist mask after etching the upper NFT layer and the planar layer not protected by the photoresist mask.

According to some embodiments of the present disclosure, removing the template is by a wet etch process leaving an opening in the planar layer.

According to some embodiments of the present disclosure, depositing the dielectric material includes filling the opening in the planar layer.

According to some embodiments of the present disclosure, planarizing the upper surface including the upper NFT layer comprises applying a chemical mechanical polishing (CMP) process to generate a planar upper surface.

Also disclosed is a near field transducer (NFT) in a thermally assisted magnetic recording (TAMR) head fabricated according to the method according to some embodiments of the present disclosure.

BRIEF DESCRIPTION OF THE DRAWINGS

The accompanying drawings, which are incorporated in and constitute a part of this specification, exemplify various embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not generally drawn to scale.

DETAILED DESCRIPTION

As the continuous demand for data storage increases, the area density for disk drives may need to continue to increase each year, and the magnetic head can be needed to improve the performance continuously. One technology to increase the area density can include thermal-assisted magnetic recording (TAMR). In TAMR, it can offer a solution to resolve the magnetic recording trilemma, which can take advantage of the fact that Coercivity is temperature-dependent. A near field transducer (NFT) can be used to focus laser power to a small region of the magnetic recording medium, which can increase the temperature of an individual grain to above the Curie temperature, then a magnetic field can be used to write data on this grain by aligning its magnetization along the applied field.

Figure 1:
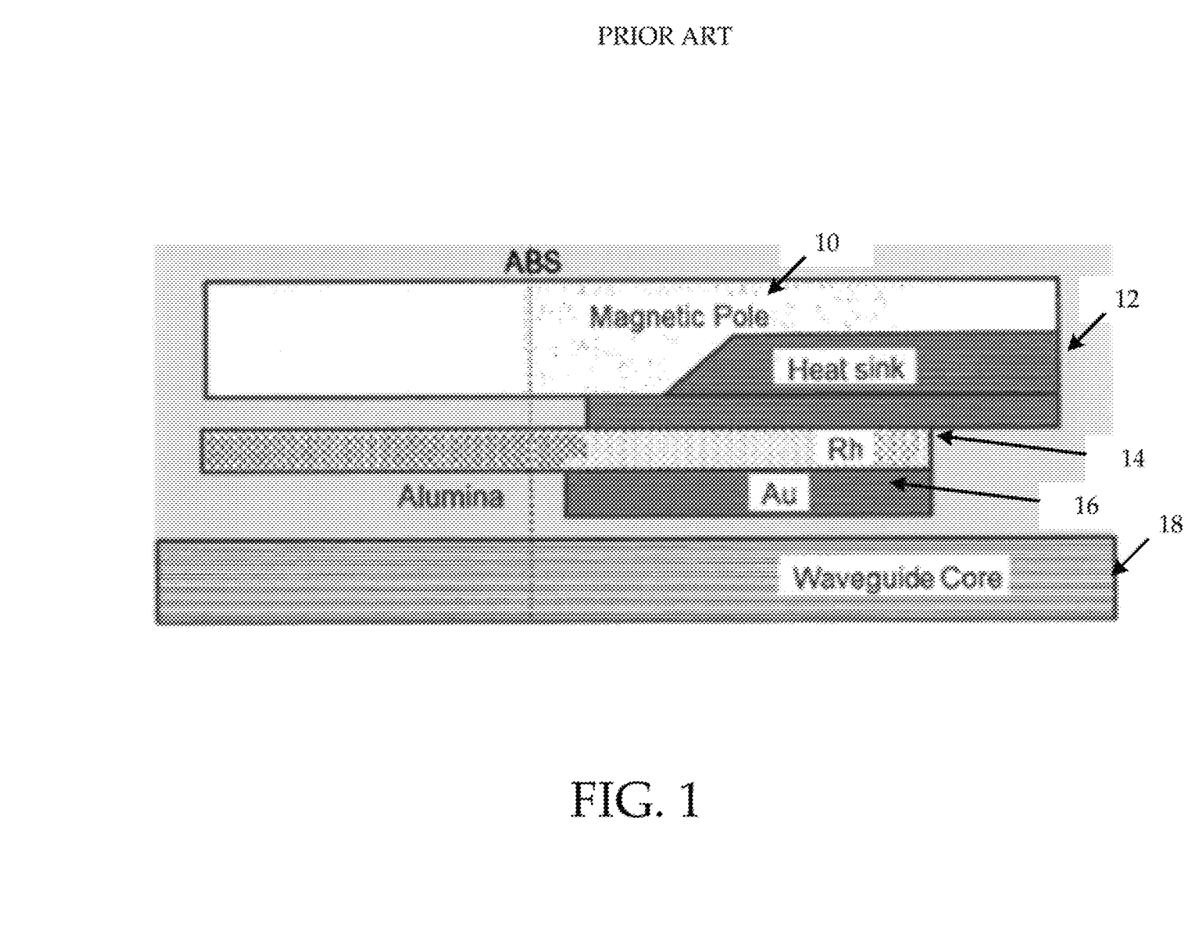
FIG. 1 illustrates a prior art design of a self-aligned Au-Rh bi-layer structure, according to some embodiments of the present disclosure.

One of the biggest challenges in TAMR recording can be to improve reliability of recording head. FIG. 1 illustrates a prior art design of a self-aligned Au-Rh bi-layer structure. As shown in FIG. 1, the design can include a magnetic pole 10, a heat sink 12, a Rhodium (Rh) layer 14, a gold (Au) layer 16, a waveguide core 18. In the design, good optical properties and robustness materials like Platinum (Pt), Rh and Iridium (Ir) can be selected as plasma generator materials, which can have a high surface plasma efficiency and can be more reliable under high temperature irradiation during TAMR writing process compared to Au only NFT design.

However, the Rh can have a face-centered cubic (FCC) crystalline structure. Rh grown on the amorphous dielectric spacer alumina (FIG. 1) can tend to be disordered polycrystalline. The grain size can also be smaller and less bonding among the atoms. During TAMR writing operation with laser, Rh peg can experience very high temperature up to 300-400° C. Small Rh peg grains may not be energetically stable at such high temperature and grains aggregate, merge and form large grains by eliminating grain boundaries. Peg recession from ABS often occurs as a result of vacancy release from grain boundaries. Such grain growth and recrystallization process happens in an uncontrollable way and could make substantial changes on Rh peg that can't be recovered in drive operation.

Figure 2:
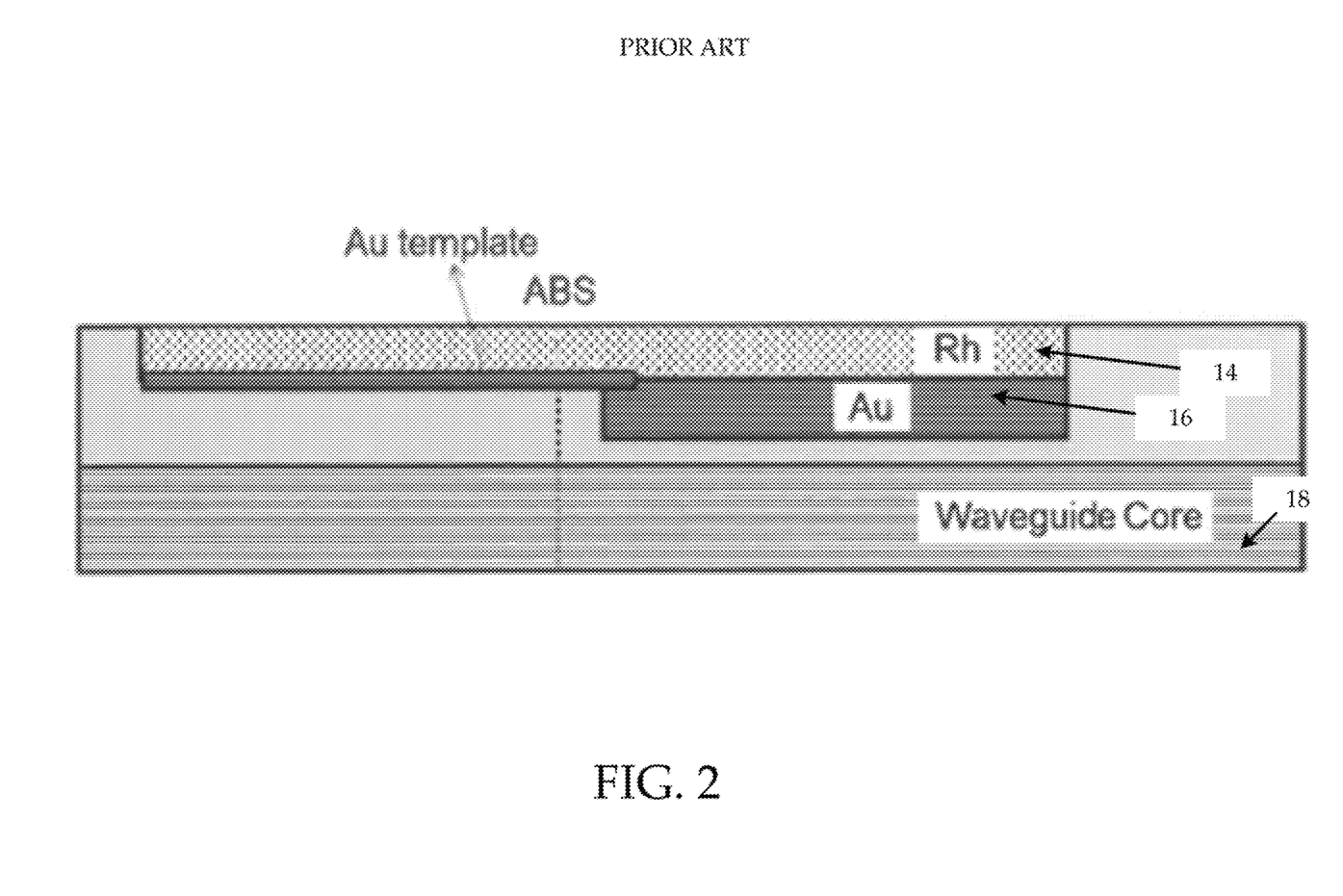
FIG. 2 illustrates another prior art structure in which Rh growth on a thin Au template, according to some embodiments of the present disclosure.

FIG. 2 illustrates another prior art structure in which Rh growth on a thin Au template. Rh grown on a thin template layer can have a fcc crystalline structure due to the template effect, and grain size becomes larger and strong bonding among the atoms. However, Au itself is not stable material under high temperature, and recesses from ABS during TAMR operation.

The present embodiments relate to a template. NFT materials like Rh, Ir, Pt etc. can be grown on a template layer. The template can be one of the metals with FCC crystalline structure, such like Cu, Co, Ni, NiFe (Ni rich), Zn, Al, CoNiFe etc., which can help NFT materials to achieve large PEG grains with a stable crystalline (111) texture. After NTF materials growth and PEG patterning process, this template metal layer can be wet-etched away by various chemicals, without reacting or damaging the NTF materials and Au. Afterwards, a conformal Alumina or SiO2 deposition can be deposited to wrap around the nano-PEG and a CMP process can be applied to finish the NFT fabrication process. The failure rate of this NFT structure could be significantly reduced, which helps to achieve CFR target of TAMR drive used in the field.

Figure 3:
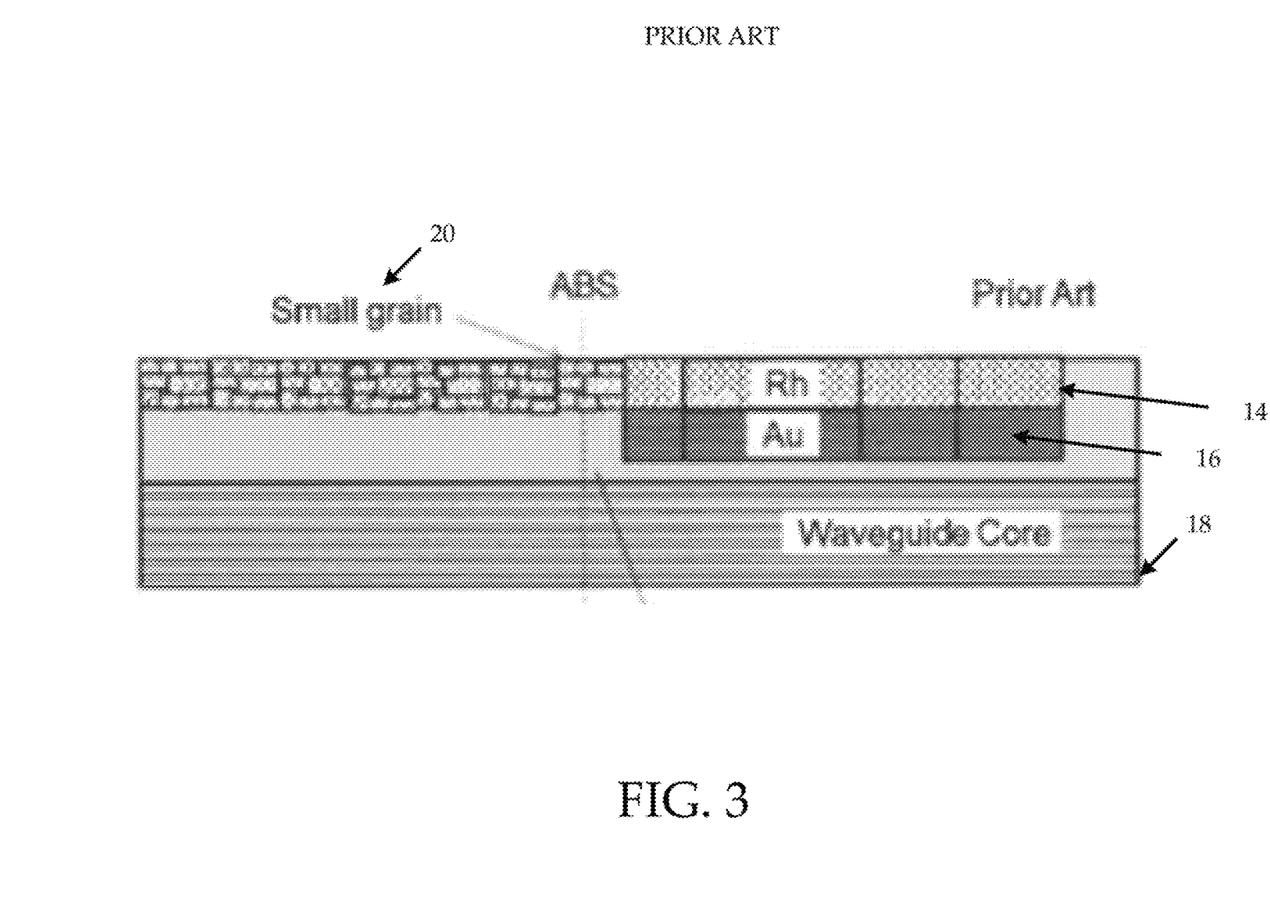
FIG. 3 illustrates a prior art design, according to some embodiments of the present disclosure.

FIG. 3 illustrates a prior art design. In FIG. 3, the design can include a Rh layer 14, an Au layer 16, a waveguide core 18, and a small grain 20.

Figure 4:
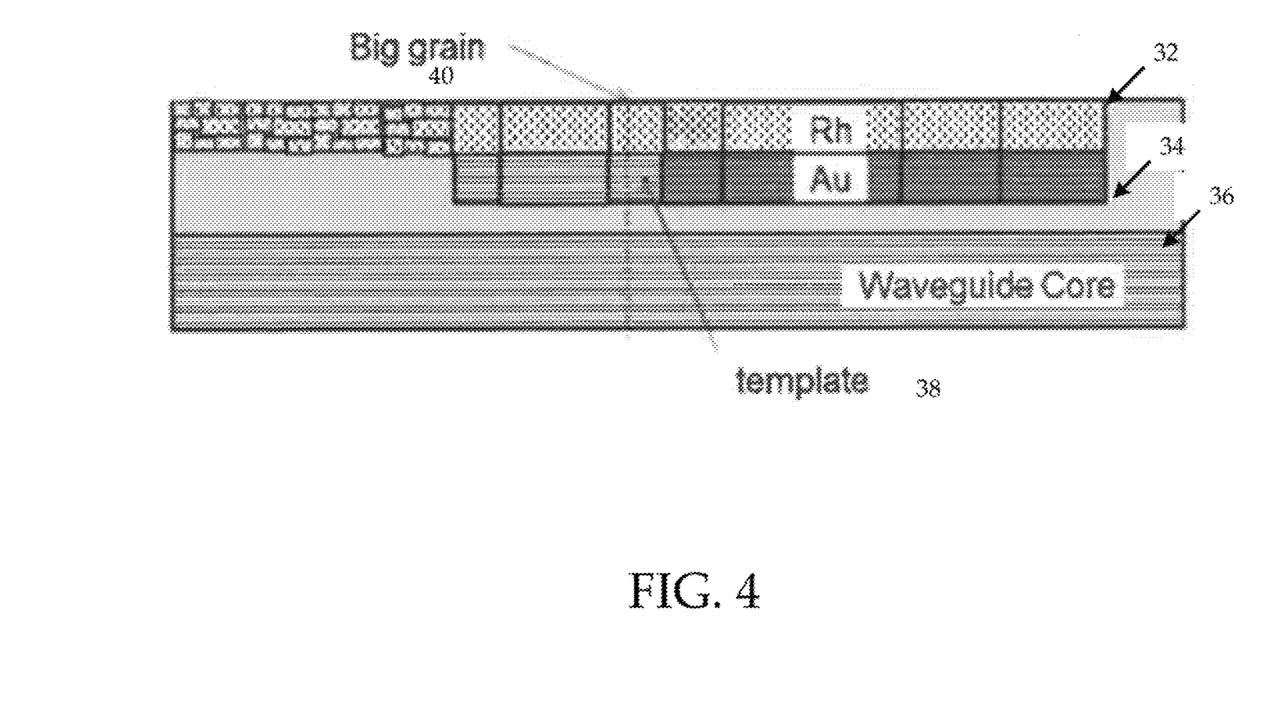
FIG. 4 is an illustration of a NFT design, according to some embodiments of the present disclosure.

FIG. 4 is an illustration of a NFT design as described herein. As shown in FIG. 4, the design can include a Rh layer 32, an Au layer 34, a waveguide core 36, template 38, and big grain 40. In comparison to prior art designs, the design as described herein has a Rh peg in Rh-Au bi-layer NFT structure that becomes big grain with desired Rh (111) orientation after proper template is selected, while in other designs, Rh peg can have multiple small polycrystalline grains with random grain orientation.

In some embodiments, as shown in FIG. 4, the NFT structure is a Rh-Au bi-layer NFT structure. The Rh-Au bilayer NFT includes the upper Rh NFT layer and the lower Au NFT layer. Without being bound to any particular theory, the fabrication process of a NFT in a TAMR head according to some embodiments of the present disclosure allow for the Rh peg in a Rh-Au bi-layer NFT structure to have big grains with the desired (111) orientation. Conventional Rh pegs in Rh-Au bi-layer NFT structures can have multiple small polycrystalline grains with random grain orientation. Furthermore, an Au template is not exposed at ABS like in other conventional Rh-Au bi-layer NFT structures, which improves the NFT reliability. A selective wet etch process can be applied and the template can be removed after large peg grains with the desired Rh (111) orientation are achieved and refilled with dielectric materials.

For instance, in comparison to the prior art design in FIG. 2, the present embodiments can have no Au template being exposed at ABS, which can improve the NFT reliability. Further, a selective wet etch process can be applied and template can be removed afterwards and refilled by dielectric material.

The method to process a TAMR head device can be used which can be applied for Self-Aligned Rh-Au bi-layer NFT or other type of NFT which has poor initial peg quality in terms of multiple small grains and/or poor grain orientation to improve the robustness of NFT in order to achieve a desired reliability level. The Self-Aligned Rh-Au bi-layer NFT structure made by a template approach can include a Self-Aligned Rh-Au bi-layer NFT structure (or other NFT material like Ir or Pt), with a large grain at Rh peg with a desired (111) out-of-plane crystalline orientation w.r.t. peg thickness direction made by template.

Further, a method of fabricating a NFT in a TAMR head is disclosed herein. According to some embodiments of the present disclosure, the method can include depositing a dielectric layer and a template layer on a waveguide core; patterning the template layer to form a template; depositing an Au NFT layer; planarizing the Au NFT layer to generate a planar layer; depositing an upper NFT layer; applying a peg patterning mask; etching the upper NFT layer and the planar layer that includes the Au NFT layer; removing the template; and depositing a dielectric material and planarizing an upper surface that includes the upper NFT layer.

Figure 5:
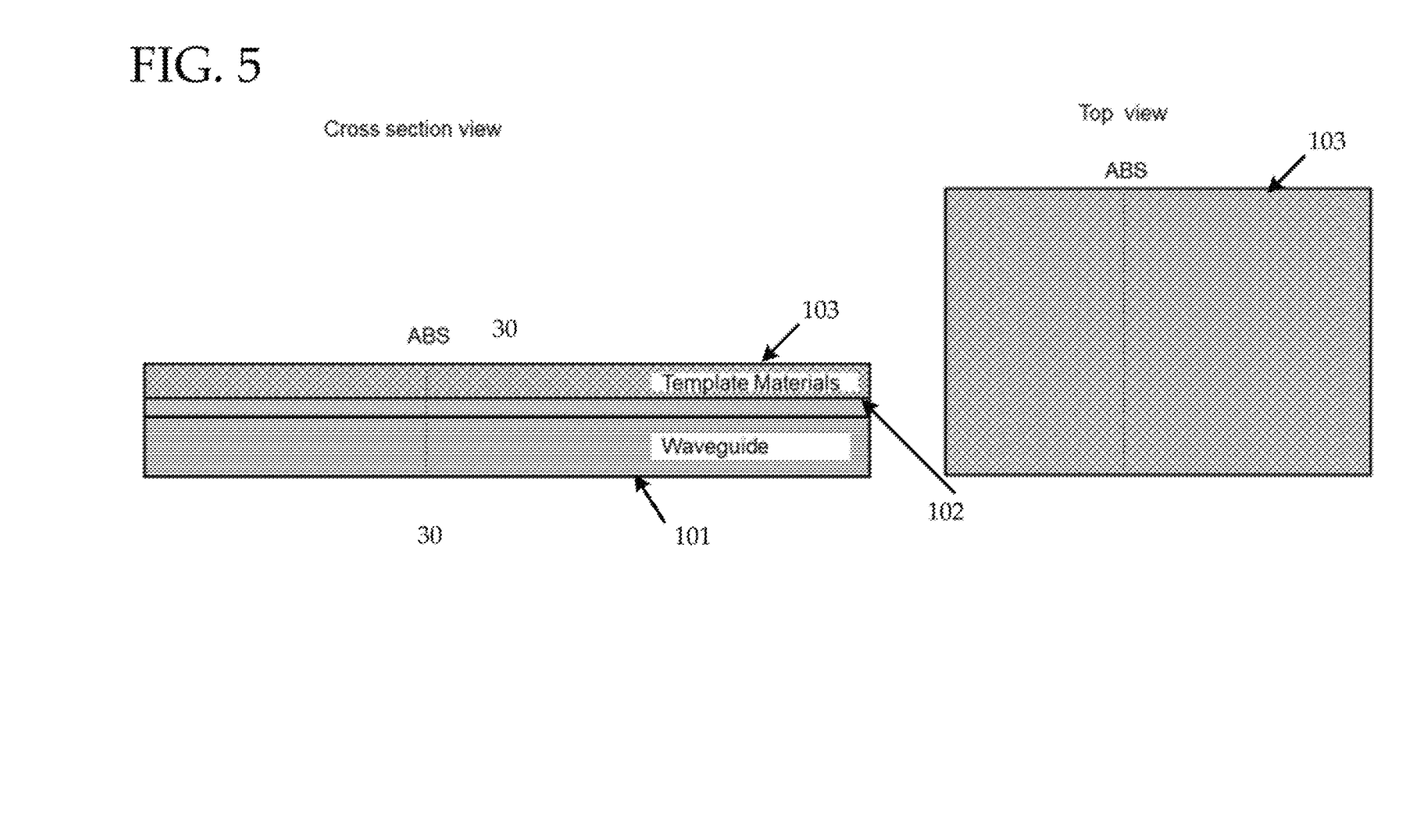
FIG. 5 illustrates a cross-sectional view and a top-down view, respectively, of depositing a dielectric layer and a template layer on a waveguide core, according to some embodiments of the present disclosure.

FIG. 5 illustrates a cross-sectional view and a top-down view of depositing a dielectric layer 102 and a template layer 103 on a waveguide core 101. In some embodiments, the dielectric layer 102 is alumina ($Al_2O_3$), SiON or $SiO_2$. In some embodiments, the dielectric layer 102 is deposited by atomic layer deposition (ALD). In some embodiments, the dielectric layer 102 is a ALD $Al_2O_3$(atomic layer deposition of alumina) layer.

In some embodiments, the template layer 103 is deposited over the dielectric layer 102. In some embodiments, the template layer can be made from a metal with face-centered cubic (fcc) crystalline structure, such as Cu, Co, Ni, NiFe, Zn, Al, and CoNiFe. Without being bound to any particular theory, the template layer 103 made from a metal with fcc crystalline structure allows for a NFT material to achieve large PEG grains with the desired stable crystalline (111) orientation. In some embodiments, the template layer 103 is not made from Au. While peg growth on an Au template layer does have the fcc crystalline structure, grain size can become large, and there is strong bonding among the atoms, the Au material is not stable under high temperature and recesses from ABS during TAMR operations. Therefore, the template layer 103 is preferably not made of Au material.

Figure 6:
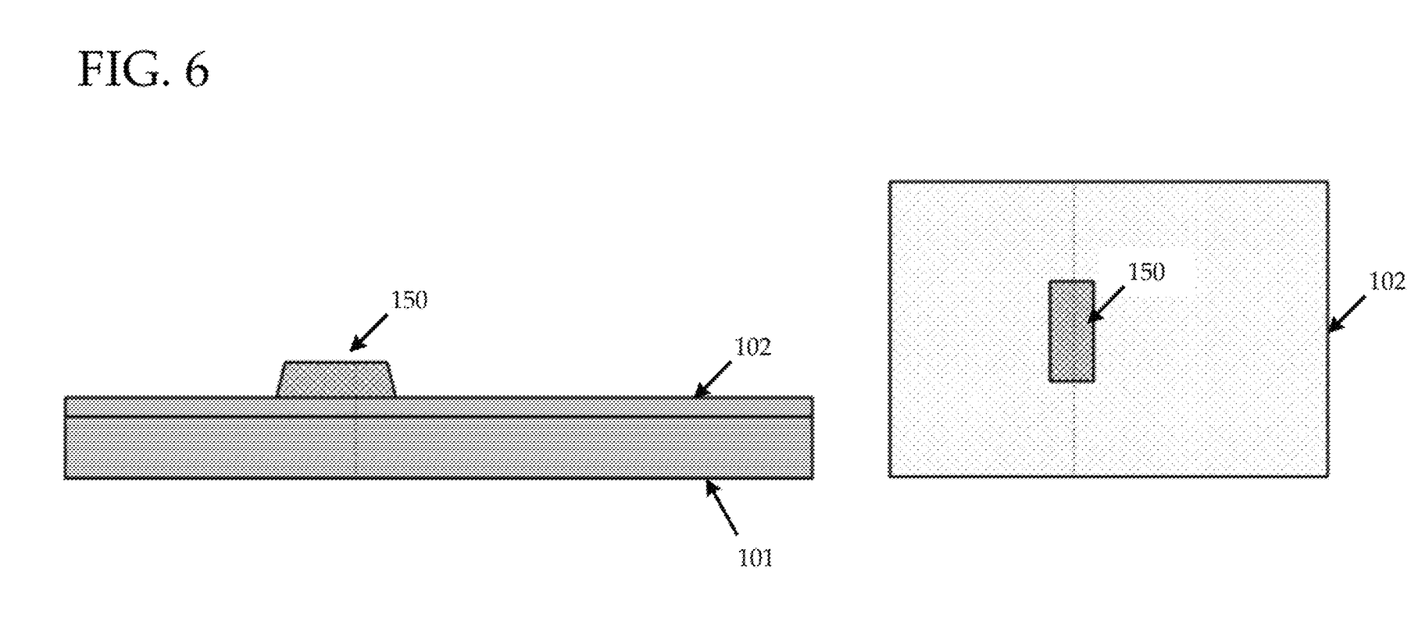
FIG. 6 illustrates a cross-sectional view and a top-down view, respectively, of patterning the template layer, according to some embodiments of the present disclosure.

FIG. 6 illustrates a cross-sectional view and a top-down view of patterning the template layer 103 to form a template 150. In some embodiments, patterning the template layer 103 includes depositing a photoresist on the template layer, transferring a pattern in the photoresist to the template layer 103 by etching, and stripping the photoresist. In some embodiments, transferring a pattern in the photoresist to the template layer 103 by etching forms the shape of the template 150. As shown in FIG. 2, the template extends along the ABS 30-30. From the cross-sectional view, the template 150 has a trapezoidal shape. From a top-down view, the template 150 has a rectangular shape. In some embodiments, the etching performed is an ion beam etching (IBE).

Figure 7:
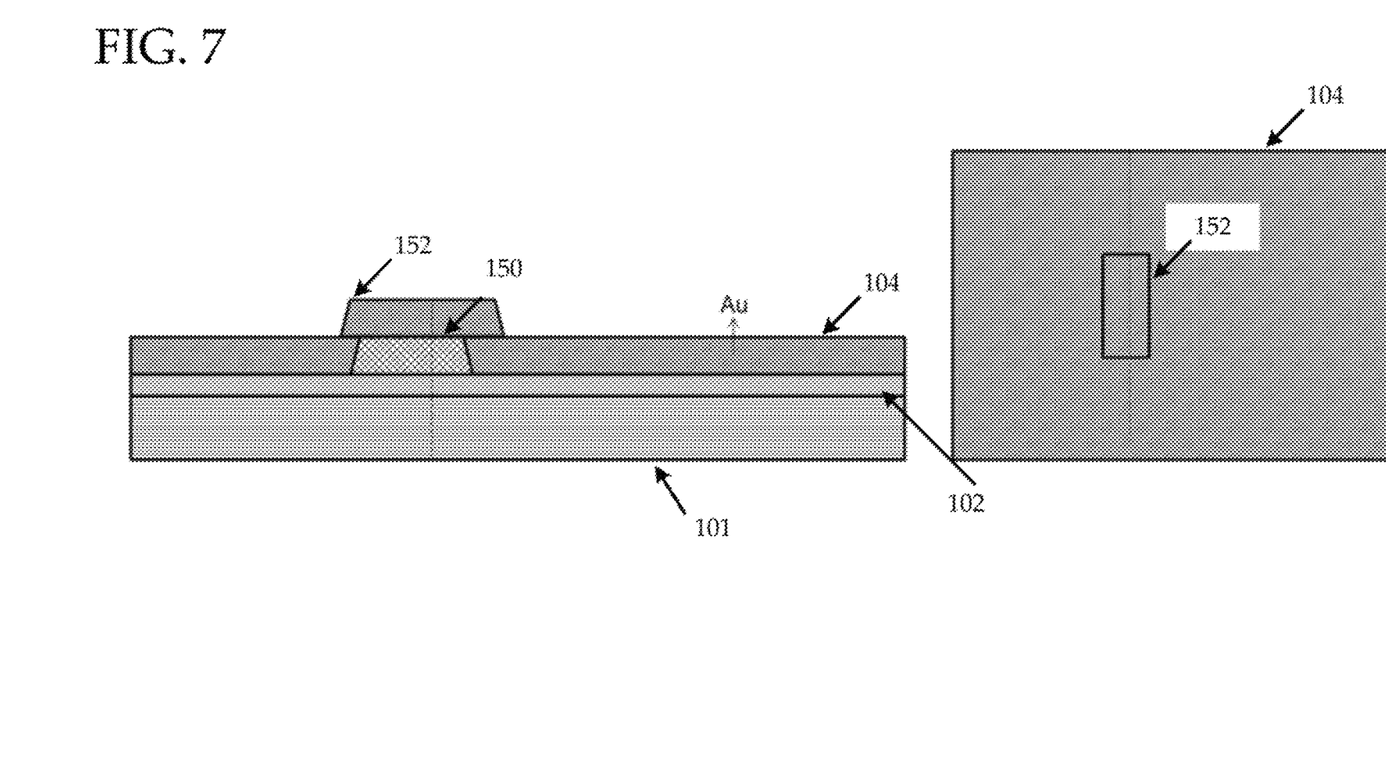
FIG. 7 illustrates a cross-sectional view and a top-down view, respectively, of depositing a NFT layer of Au, according to some embodiments of the present disclosure.

FIG. 7 illustrates a cross-sectional view and a top-down view of depositing a NFT layer with a part 152 over the template 150 and another part 104 over the exposed dielectric layer 102. Deposition of the layer 104 of Au can be carried out by any means known in the art.

Figure 8:
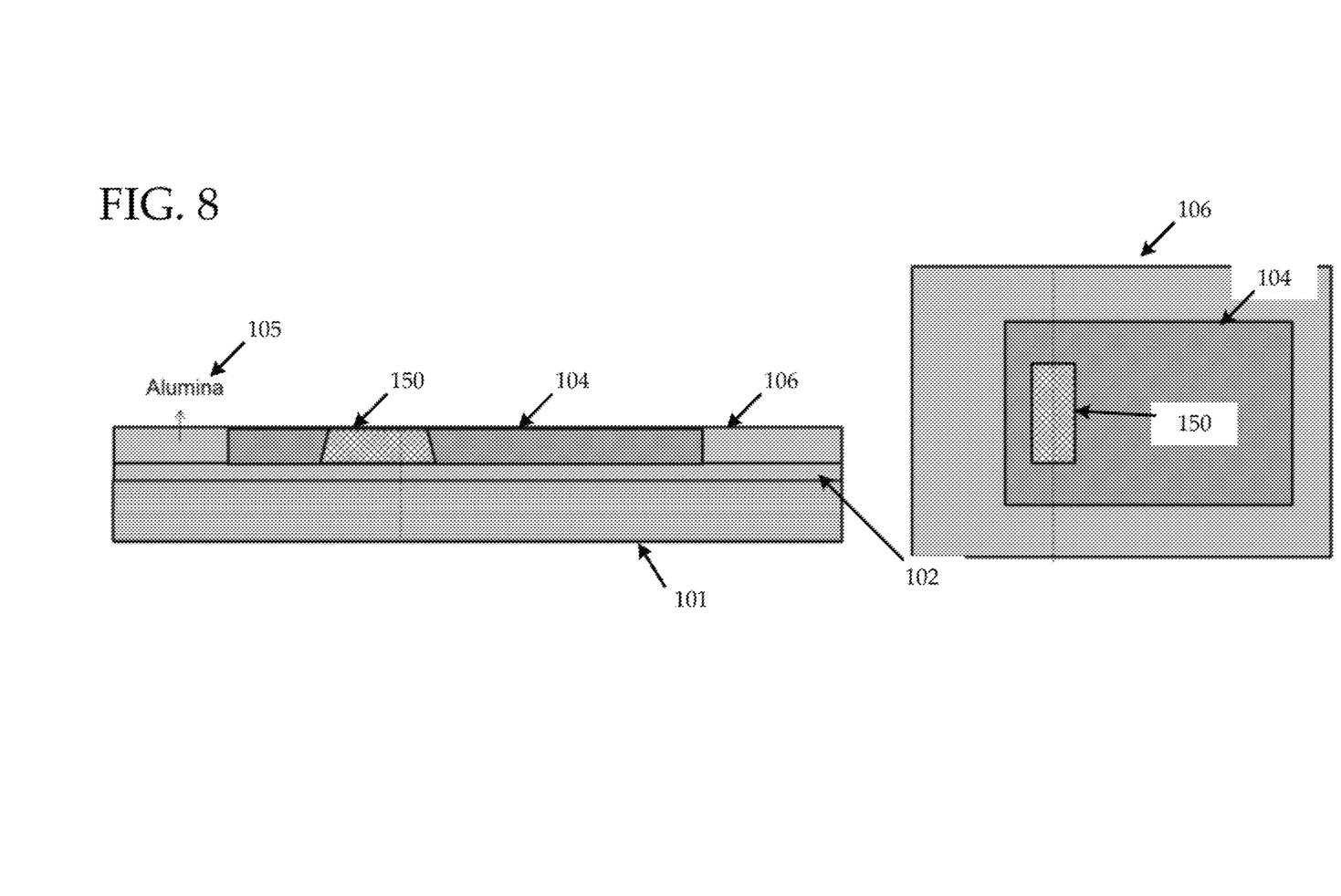
FIG. 8 illustrates a cross-sectional view and a top-down view, respectively, of planarizing the Au NFT layer, according to some embodiments of the present disclosure.

FIG. 8 illustrates a cross-sectional view and a top-down view of planarizing the Au NFT layer 104. In some embodiments, planarizing the Au layer 104 includes removing an after field Au portion of Au NFT layer 104, depositing a second dielectric layer 105, and applying a chemical mechanical polishing (CMP) process to generate a planar layer 106. In some embodiments, the planar layer 106 includes the second dielectric layer 105, the Au NFT layer 104, and the template 150. In some embodiments, the planar layer 106 is in direct contact with the dielectric layer 102.

In some embodiments, the dielectric layer 105 is alumina ($Al_2O_3$), SiON or $SiO_2$. In some embodiments, the dielectric layer 105 is deposited by atomic layer deposition (ALD). In some embodiments, the dielectric layer 105 is a ALD $Al_2O_3$(atomic layer deposition of alumina) layer.

Figure 9:
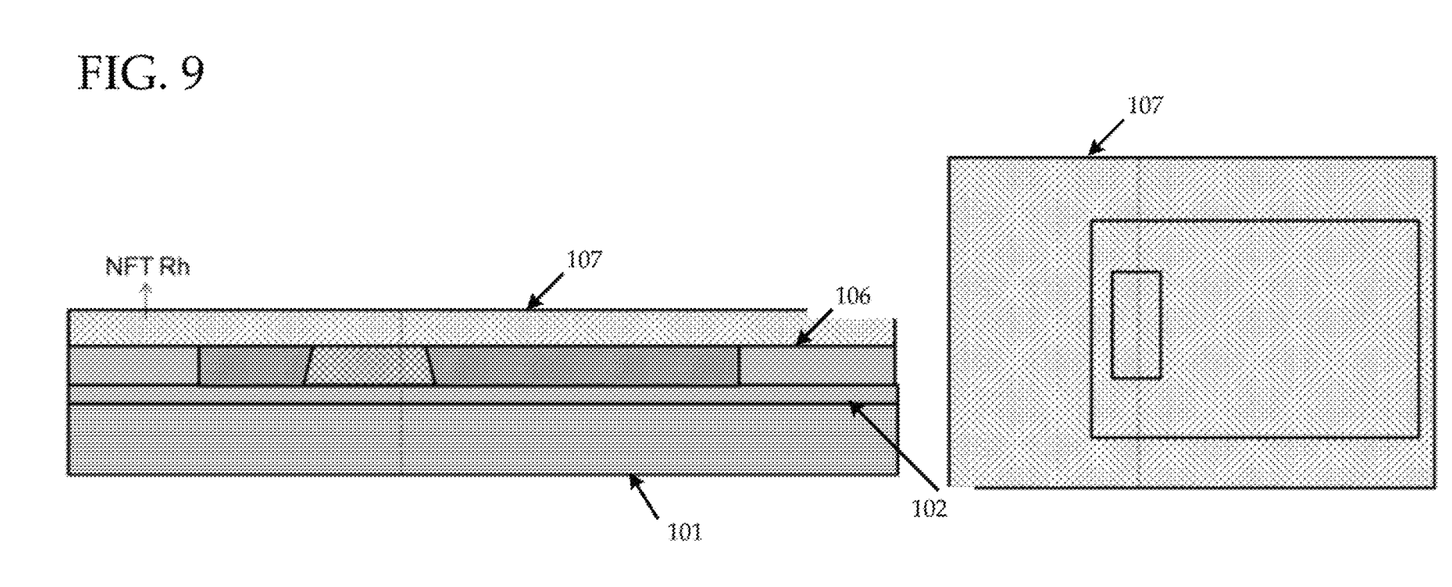
FIG. 9 illustrates a cross-sectional view and a top-down view, respectively, of depositing an upper NFT layer, according to some embodiments of the present disclosure.

FIG. 9 illustrates a cross-sectional view and a top-down view of depositing an upper NFT layer 107. In some embodiments, the upper NFT layer 107 includes a platinum group metal, such as ruthenium, rhodium, palladium, osmium, iridium, and platinum, or combinations thereof. In some embodiments, the upper NFT layer 107 is a Rh NFT layer deposited over the planar layer 106 that includes the Au NFT layer 104, template 150, and second dielectric layer 105. Deposition of the upper NFT layer 107 (e.g., Rh) can be carried out by any means known in the art.

Figure 10:
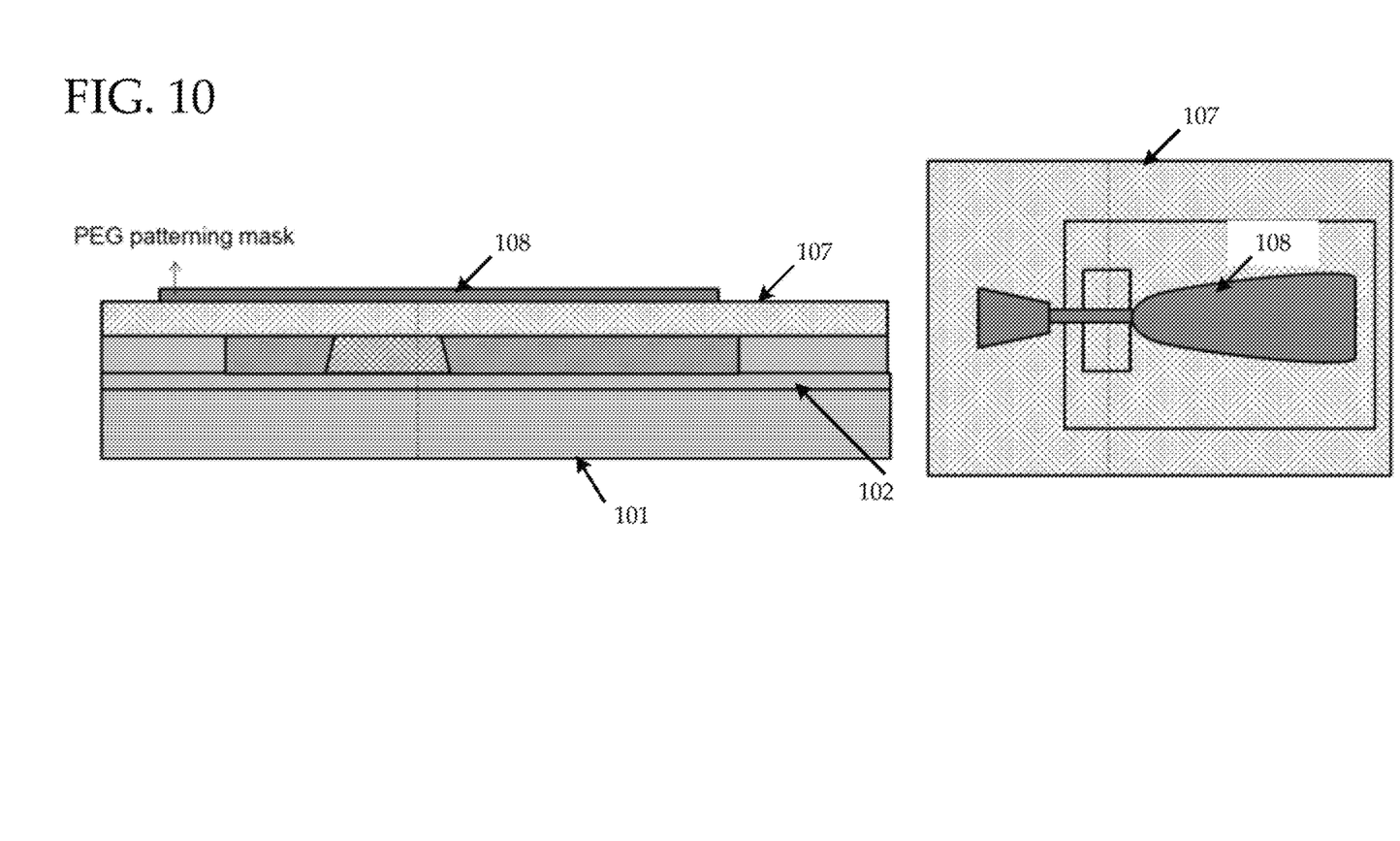
FIG. 10 illustrates a cross-sectional view and a top-down view, respectively, of applying a peg patterning mask, according to some embodiments of the present disclosure.

FIG. 10 illustrates a cross-sectional view and a top-down view of applying a peg patterning mask. In some embodiments, applying a peg patterning mask includes depositing a photoresist layer on the upper NFT layer 107 and patterning the photoresist layer to form a photoresist mask 108 with a top-down view in the desired shape of the NFT. In some embodiments, as shown in the top-down view of FIG. 6, the photoresist mask 108 includes a rod-shaped neck that extends orthogonal to the ABS 30-30 and a parabolic (in the horizontal plane) main body. The parabolic shape of the body portion is visible only from an overhead view in the horizontal plane and the rod would be seen as emerging from the base of the parabola.

Figure 11:
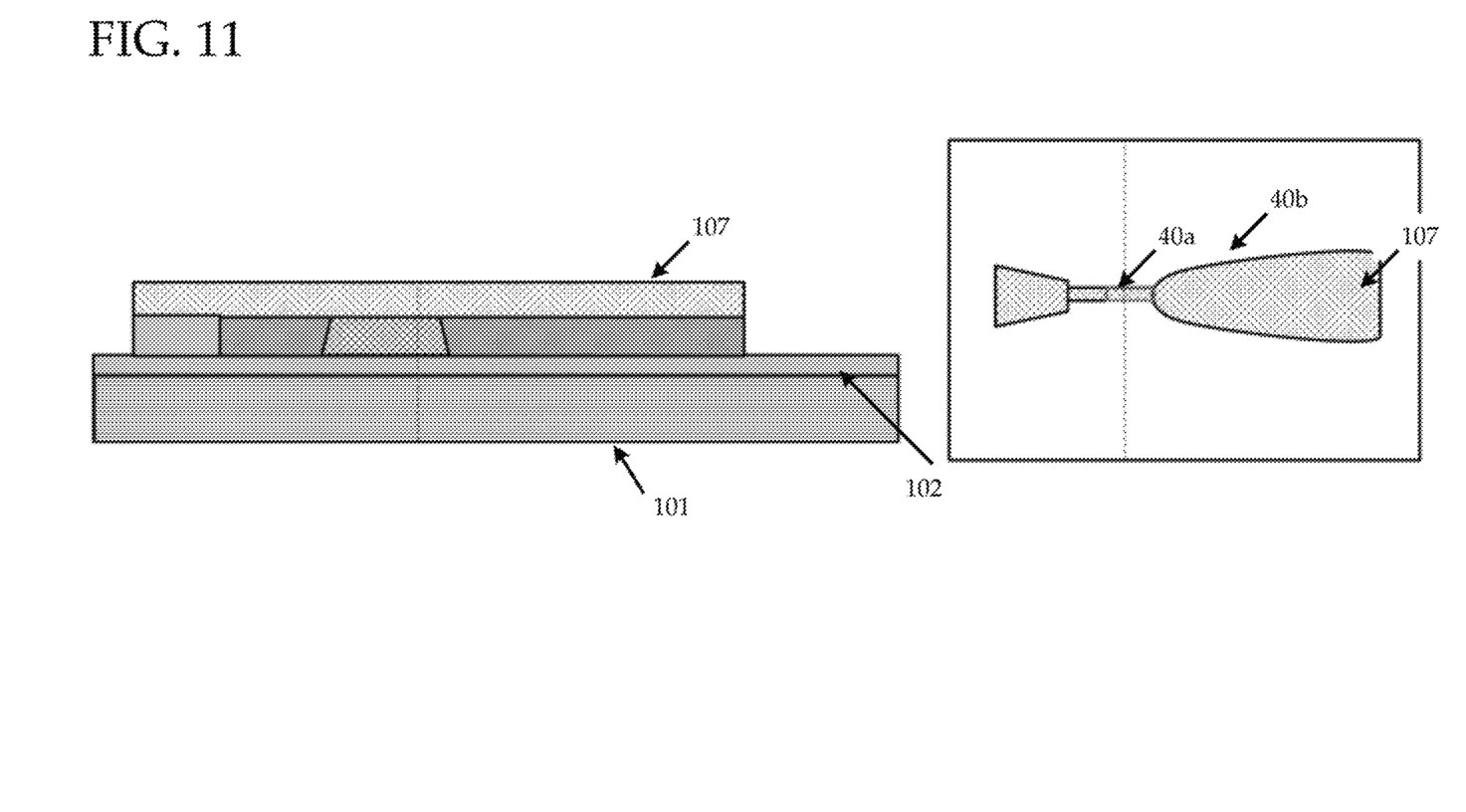
FIG. 11 illustrates a cross-sectional view and a top-down view, respectively of etching the upper NFT layer and the planar layer that includes the lower Au NFT layer, according to some embodiments of the present disclosure.

FIG. 11 illustrates a cross-sectional view and a top-down view of etching the upper NFT layer 107 and planar layer 106 (including the Au NFT layer) not protected by the photoresist mask 108 to form the final-dimensioned target NFT shape. In some embodiments, etching the upper NFT layer 107 (e.g., Rh layer) and planar layer 106 is a dry etching process. In some embodiments, after etching the layer 107 and planar layer 106 not protected by the photoresist mask 108, the photoresist mask 108 is removed. Photoresist mask removal can be carried out by any means known in the art.

As shown in the top-down view of FIG. 11, the peg includes a rod-shaped neck 40a that extends orthogonal to the ABS 30-30 and a parabolic (in the horizontal plane) main body 40b. The parabolic shape of the body portion is visible only from an overhead view in the horizontal plane and the rod would be seen as emerging from the base of the parabola.

Figure 12:
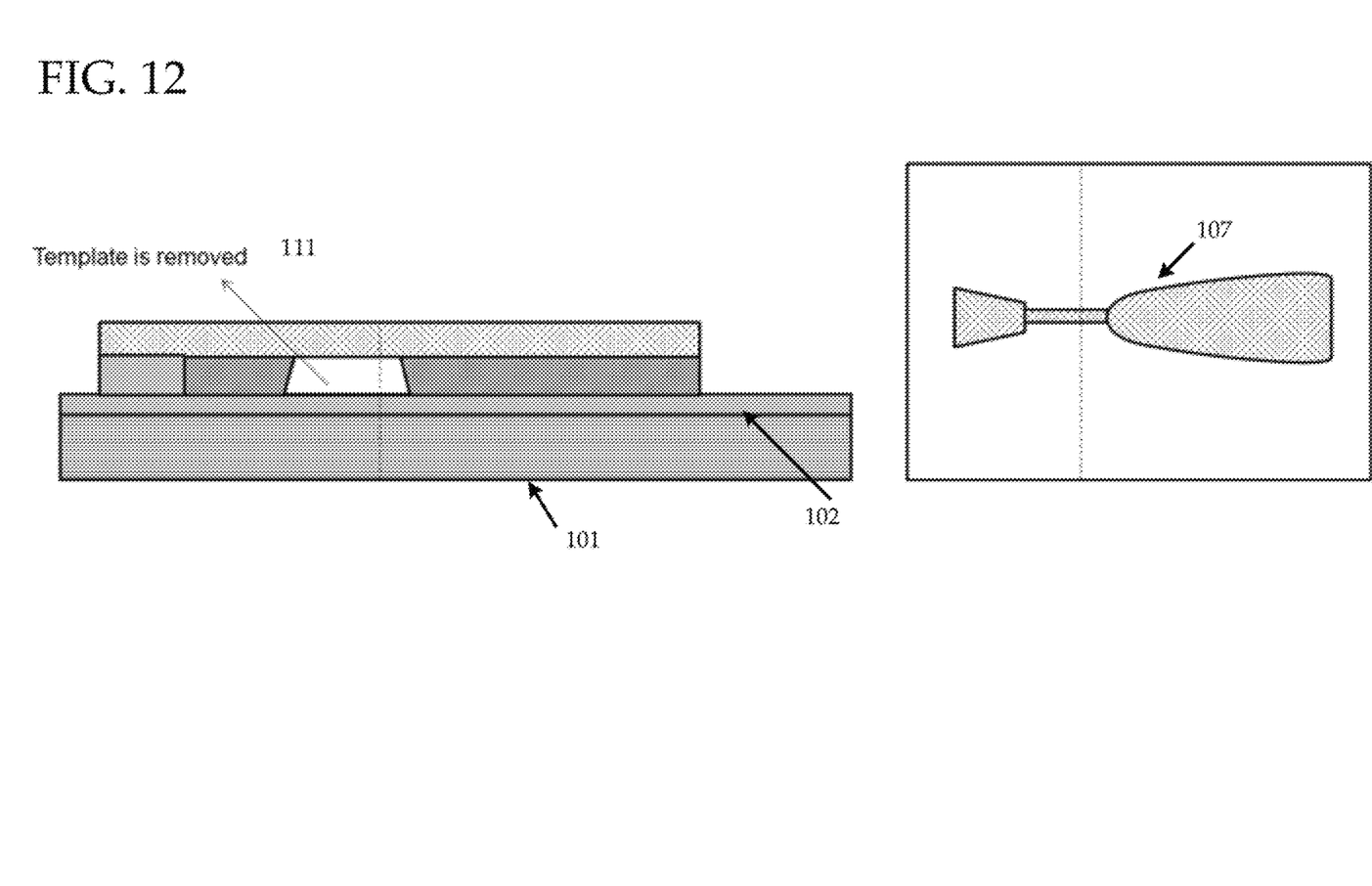
FIG. 12 illustrates a cross-sectional view and a top-down view, respectively, of removing the template, according to some embodiments of the present disclosure.

FIG. 12 illustrates a cross-sectional view and a top-down view of removing the template 150 by a wet etch process. The wet etch process is not intended to affect the upper NFT layer 107 (e.g., Rh layer) and the lower Au NFT layer 104 (part of the planar layer 106) and only the template 150 is removed. In some embodiments, removing the template 150 by a wet etch process leaves an opening 111 in the layer 106. The wet etch process removing the template 150 can be carried out by any means known in the art.

Figure 13:
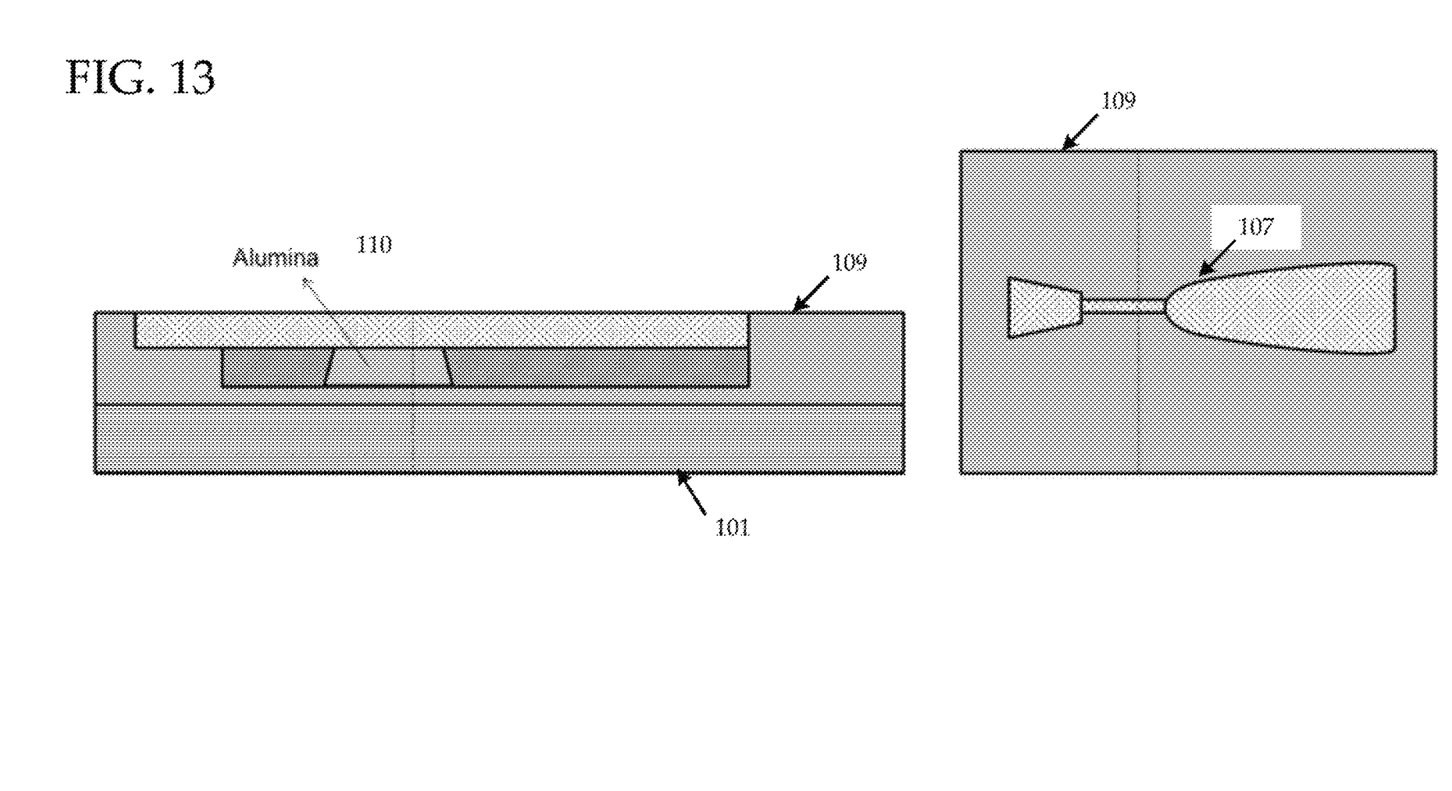
FIG. 13 illustrates a cross-sectional view and a top-down view, respectively, of depositing a dielectric material and planarizing an upper surface that includes the upper NFT layer, according to some embodiments of the present disclosure.

FIG. 13 illustrates a cross-sectional view and a top-down view of depositing a dielectric material 110 and planarizing a top surface 109 that includes the upper NFT layer 107. In some embodiments, depositing the dielectric material 110 includes filling the opening 111 in the layer 106 left by the removal of the template 150. In some embodiments, depositing a dielectric material 110 includes plasma enhanced chemical vapor deposition (PECVD) of SiO2 or atomic layer deposition of alumina. In some embodiments, planarizing the top surface 109 including the upper NFT layer 107 comprises applying a chemical mechanical polishing (CMP) process to generate a planar top surface 109 including the layer 107 (e.g., Rh layer) as well as the dielectric material 110.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method of fabricating a near field transducer (NFT) in a thermally assisted magnetic recording (TAMR) head, comprising:
   depositing a dielectric layer and a template layer on a waveguide core;
   patterning the template layer to form a template;
   depositing an Au NFT layer;
   planarizing the Au NFT layer to generate a planar layer;
   depositing an upper NFT layer;
   applying a peg patterning mask;
   etching the upper NFT layer and the planar layer that includes the Au NFT layer; removing the template; and
   depositing a dielectric material and planarizing an upper surface that includes the upper NFT layer.

2. The method of claim 1, wherein the dielectric layer includes alumina ($Al_2O_3$), SiON or $SiO_2$.

3. The method of claim 1, wherein depositing the dielectric layer is by atomic layer deposition (ALD).

4. The method of claim 1, wherein the dielectric layer is a ALD $Al_2O_3$ (atomic layer deposition of alumina) layer.

5. The method of claim 1, wherein patterning the template layer to form the template includes depositing a photoresist on the template layer, transferring a pattern in the photoresist to the template layer by etching, and stripping the photoresist.

6. The method of claim 1, wherein transferring the pattern in the photoresist to the template layer by etching forms a shape of the template.

7. The method of claim 1, wherein the template extends along the ABS.

8. The method of claim 5, wherein the etching performed is an ion beam etching (IBE).

9. The method of claim 1, wherein planarizing the Au NFT layer includes removing an after field Au portion of the Au NFT layer, depositing a second dielectric layer, and applying a chemical mechanical polishing (CMP) process to generate a planar layer.

10. The method of claim 9, wherein the planar layer includes the second dielectric layer, the Au NFT layer, and the template.

11. The method of claim 10, wherein the planar layer is in direct contact with the dielectric layer.

12. The method of claim 1, wherein the upper NFT layer includes a platinum group metal, such as ruthenium, rhodium, palladium, osmium, iridium, and platinum, or combinations thereof.

13. The method of claim 1, wherein the upper NFT layer is a Rh NFT layer deposited over the planar layer 106.

14. The method of claim 1, wherein applying the peg patterning mask includes depositing a photoresist layer on the upper NFT layer and patterning the photoresist layer to form a photoresist mask.

15. The method of claim 1, wherein etching the upper NFT layer and the planar layer is a dry etching process.

16. The method of claim 14, further comprising removing the photoresist mask after etching the upper NFT layer and the planar layer not protected by the photoresist mask.

17. The method of claim 1, wherein removing the template is by a wet etch process leaving an opening in the planar layer.

18. The method of claim 1, wherein depositing the dielectric material includes filling the opening in the planar layer.

19. The method of claim 1, wherein planarizing the upper surface including the upper NFT layer comprises applying a chemical mechanical polishing (CMP) process to generate a planar upper surface.

20. A near field transducer (NFT) in a thermally assisted magnetic recording (TAMR) head fabricated according to the method of claim 1.

* * * * *